Dec. 9, 1947.  D. D. STREID  2,432,359
INTERNAL-COMBUSTION TURBINE POWERPLANT
Filed March 7, 1944   6 Sheets-Sheet 1

Inventor
Dale D. Streid
by Harry E. Dunham
His Attorney

Dec. 9, 1947.   D. D. STREID   2,432,359
INTERNAL-COMBUSTION TURBINE POWERPLANT
Filed March 7, 1944   6 Sheets-Sheet 2
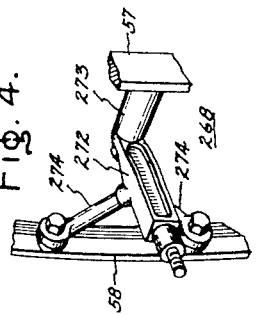
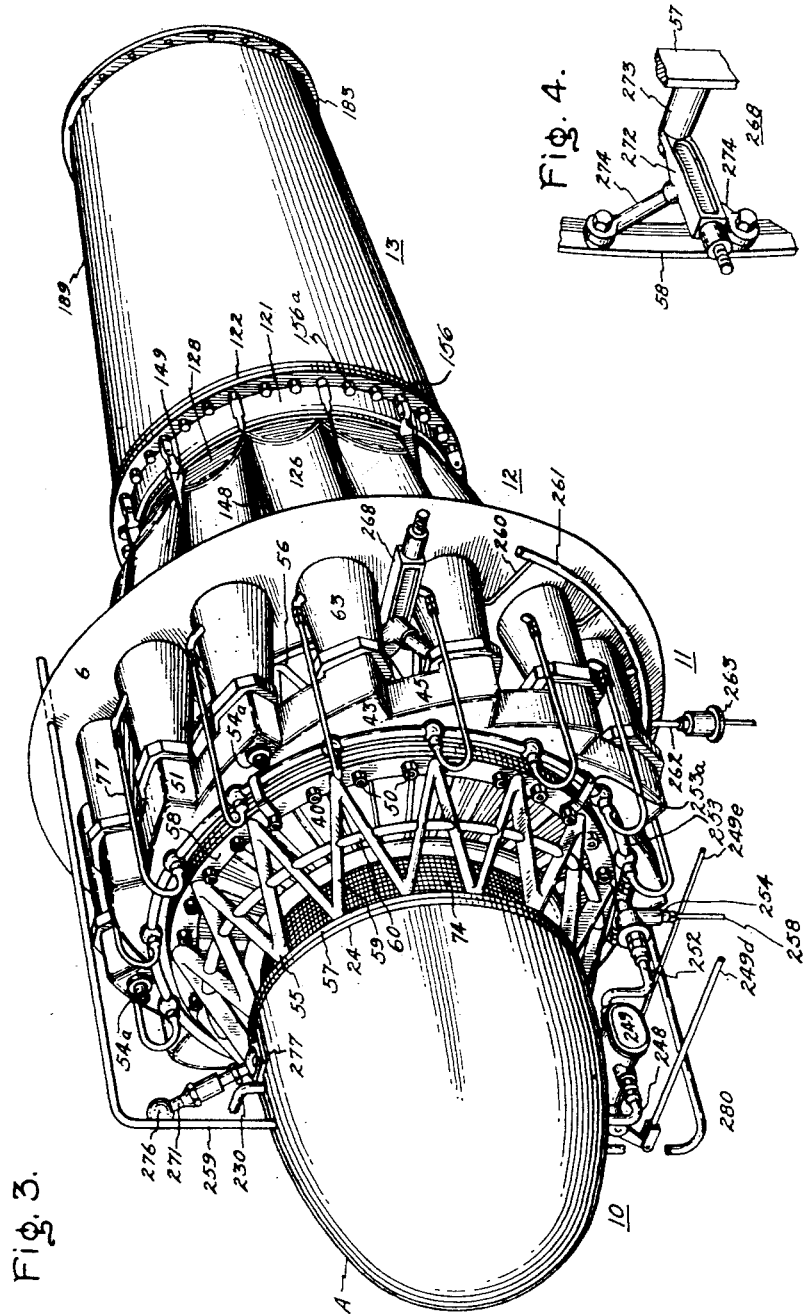
Inventor
Dale D. Streid
by Harry E. Dunham
His Attorney

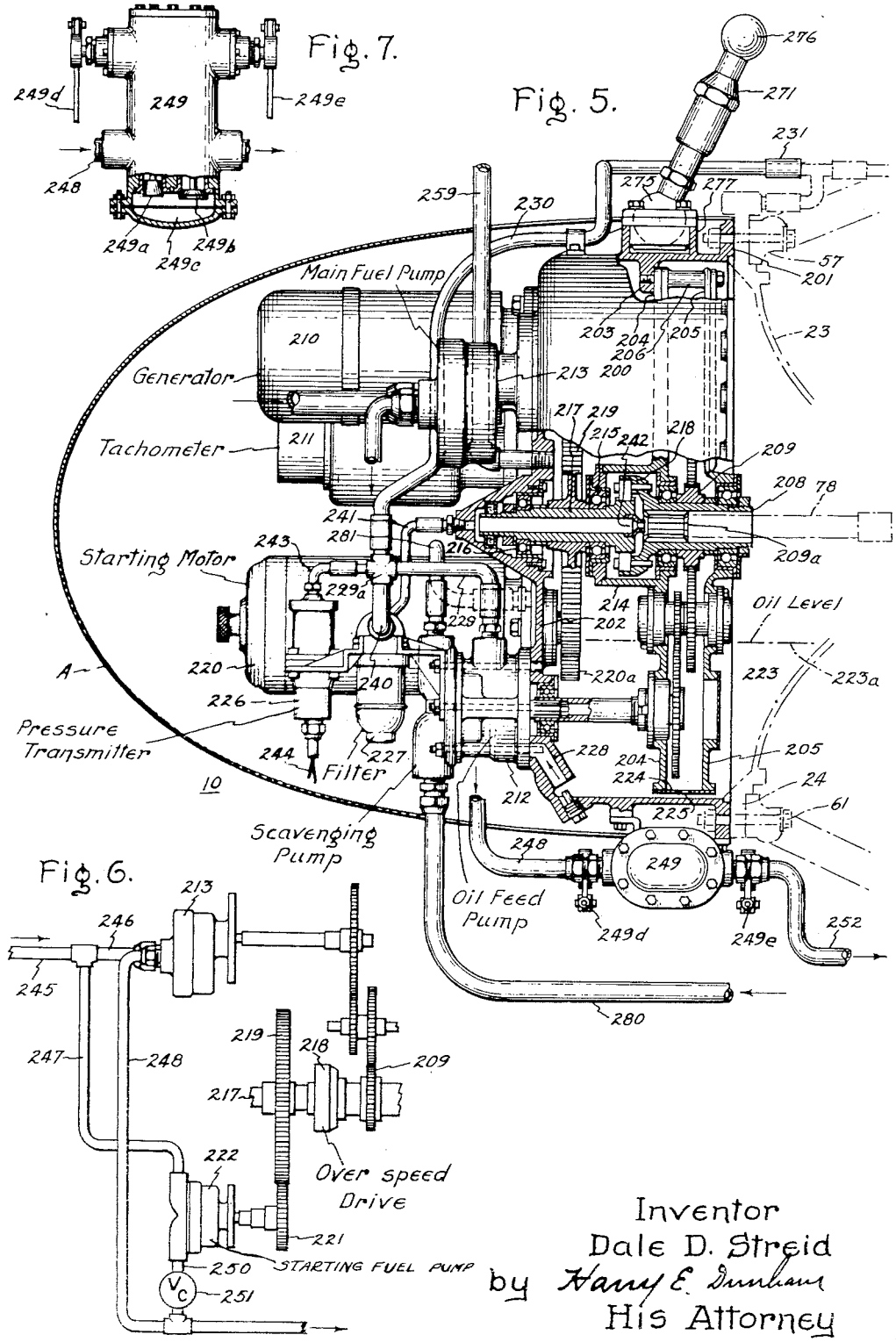

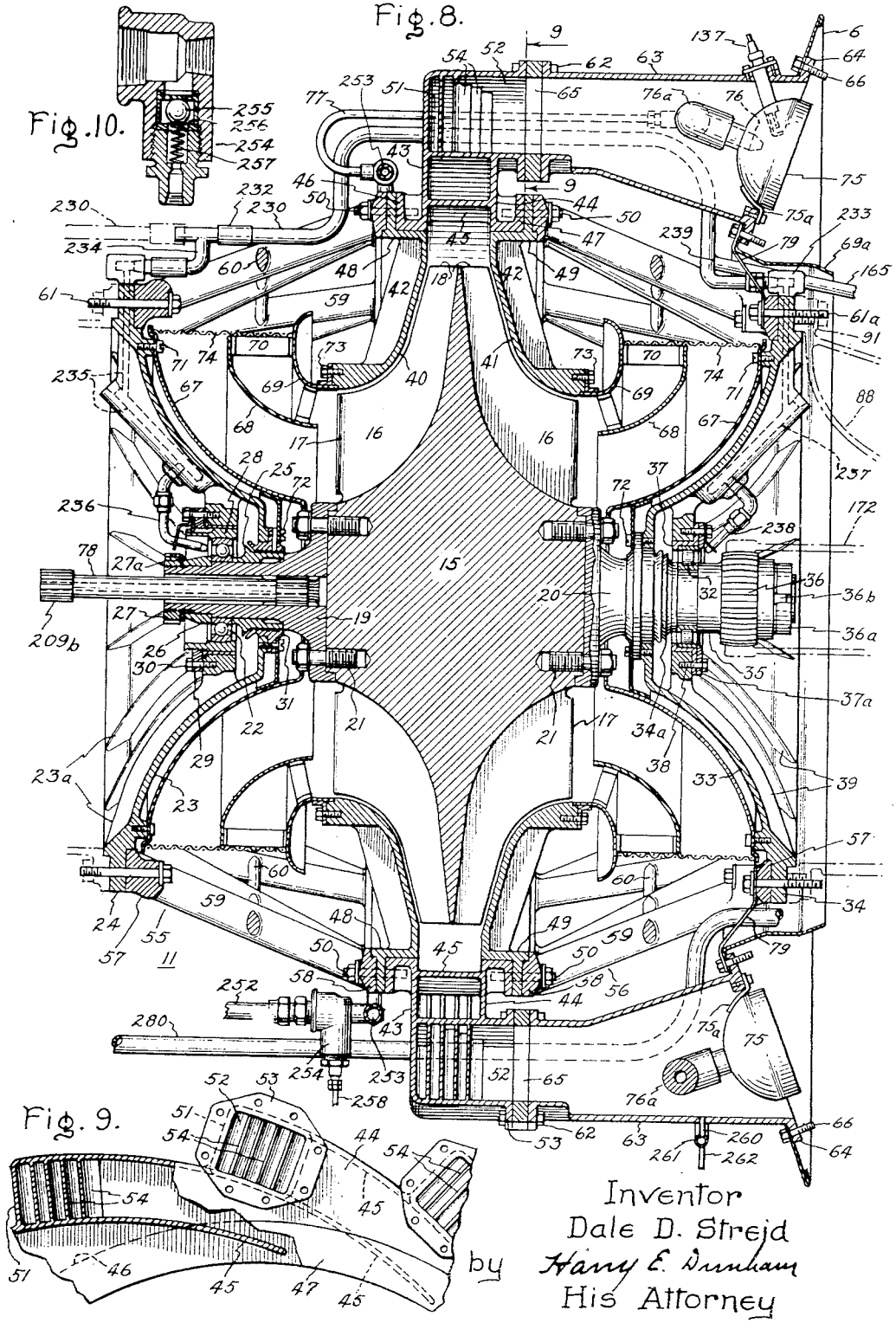

Dec. 9, 1947.   D. D. STREID   2,432,359
INTERNAL-COMBUSTION TURBINE POWERPLANT
Filed March 7, 1944   6 Sheets-Sheet 5
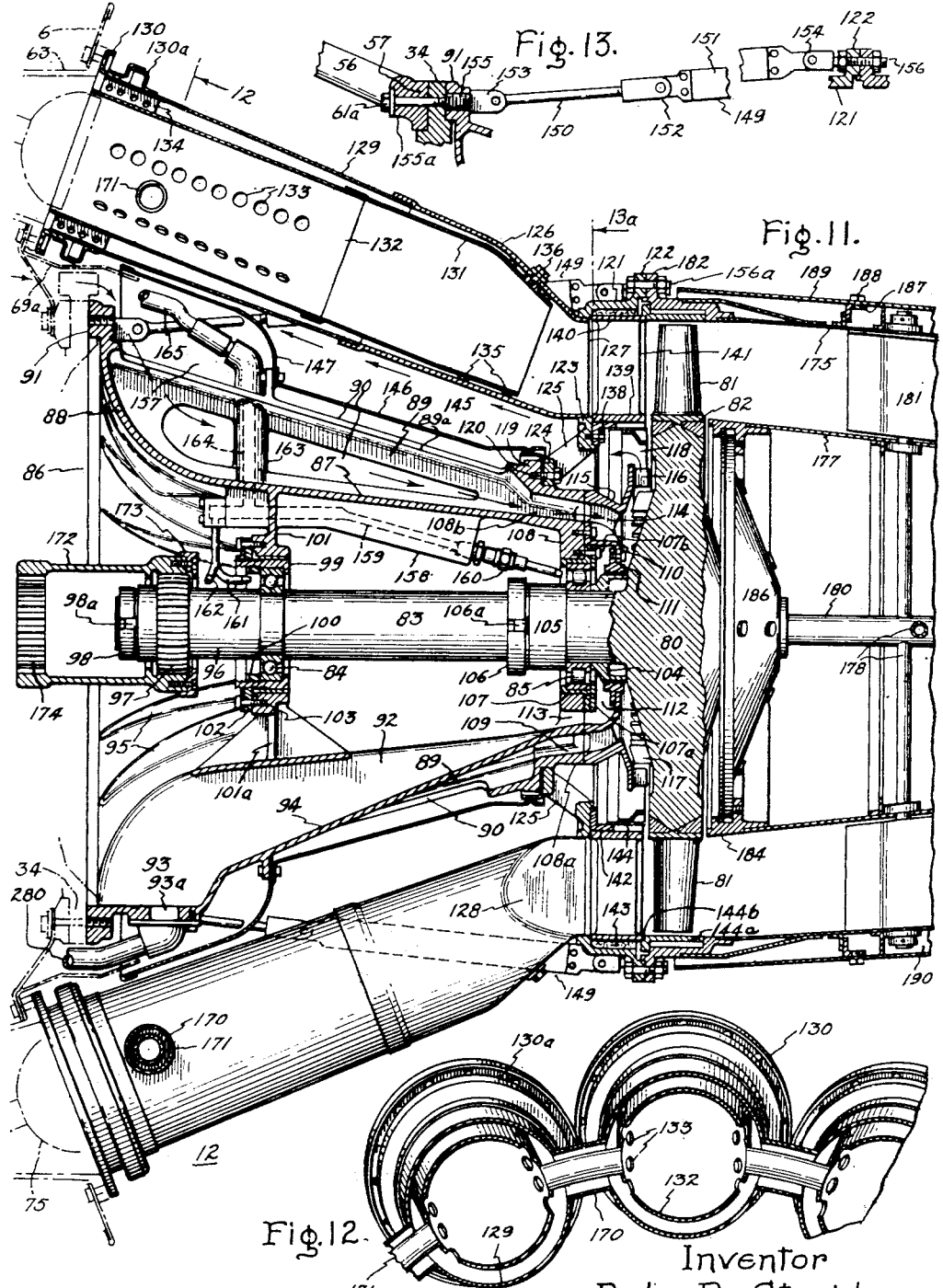
Inventor
Dale D. Streid
by Harry E. Dunham
His Attorney

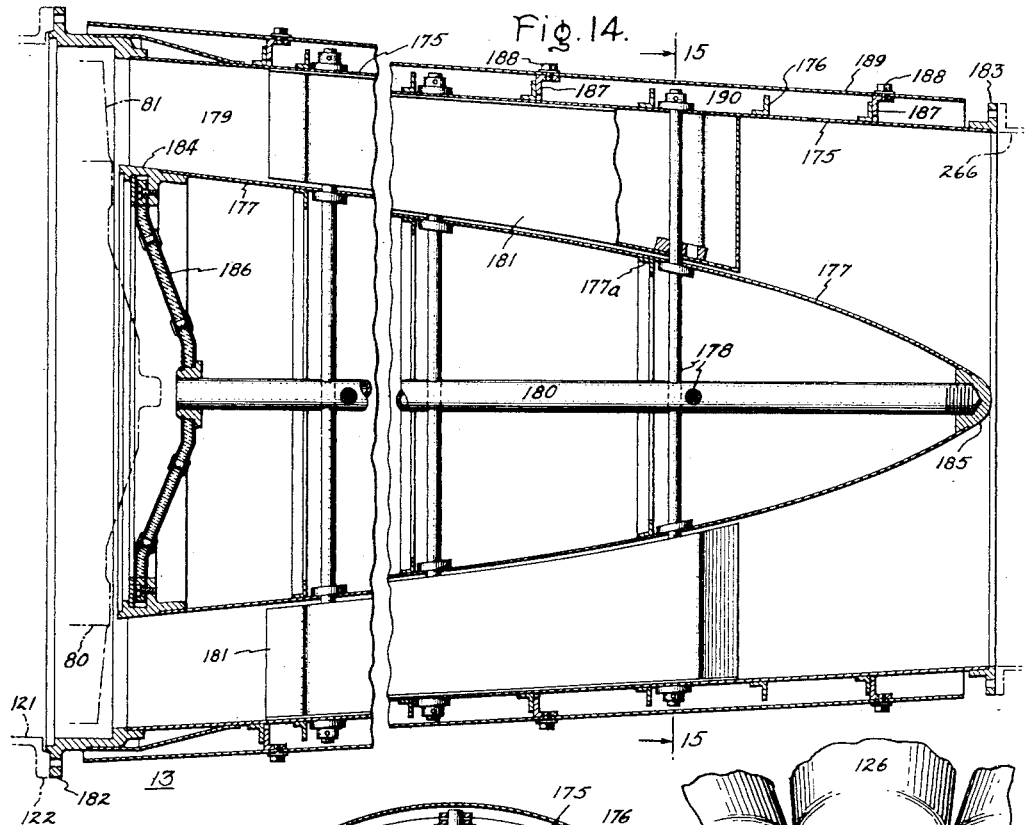
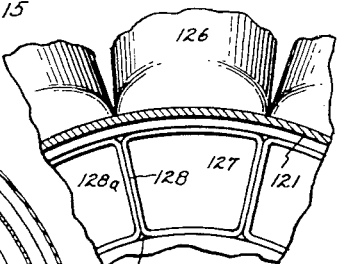
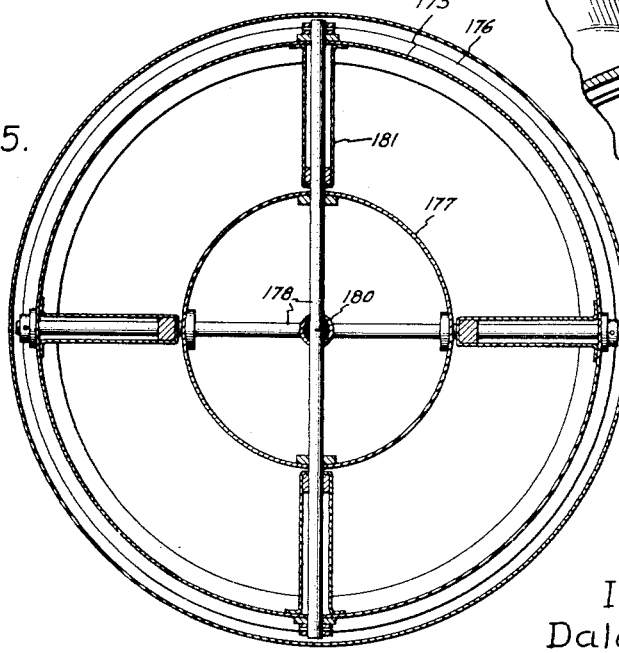

Patented Dec. 9, 1947

2,432,359

UNITED STATES PATENT OFFICE 2,432,359

INTERNAL-COMBUSTION TURBINE POWER PLANT

Dale D. Streid, Saugus, Mass., assignor to General Electric Company, a corporation of New York Application March 7, 1944, Serial No. 525,391

23 Claims. (Cl. 60—41)

The present invention relates to power plants and especially to gas turbine power plants comprising an air compressor supplying air under pressure to a combustion chamber or chambers in which fuel is burned and from which the hot products of combustion, hereinafter called hot gases are supplied to a turbine wheel, the turbine wheel in turn driving the air compressor, the excess of energy in the hot gases over that required to drive the air compressor being used to generate power. A gas turbine power plant embodying my invention is well adapted for use on aircraft for propelling them and it is this application of my invention which I have elected specifically to illustrate and describe. It is to be understood, however, that the invention is not limited necessarily to this use.

In carrying out my invention in its application to an aircraft, I may utilize in the turbine wheel only sufficient energy from the gases to run the air compressor and certain auxiliaries appurtenant to the power plant such as the fuel oil pump or pumps, the remaining energy being utilized to drive the aircraft by means of jet propulsion. Or all the energy may be utilized in the turbine wheel and the power thus made available used to drive a usual form of bladed propeller. Or the energy may be extracted by a separate turbine or other means of generating power, or any combination of these.

The object of my invention is to provide an improved power plant which is relatively light in weight, simple and compact in structure, and capable of being easily assembled and dismantled. For a consideration of what I believe to be novel and my invention attention is directed to the following specification and to the claims appended thereto.

Figure 1:
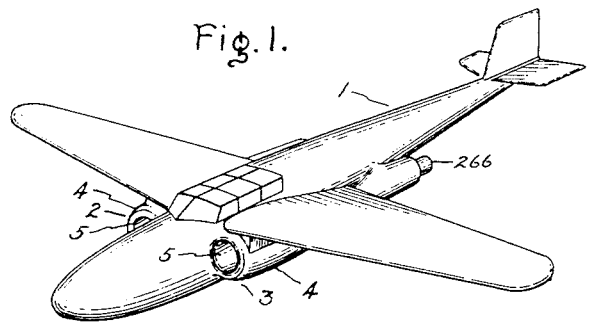
Figure 2:
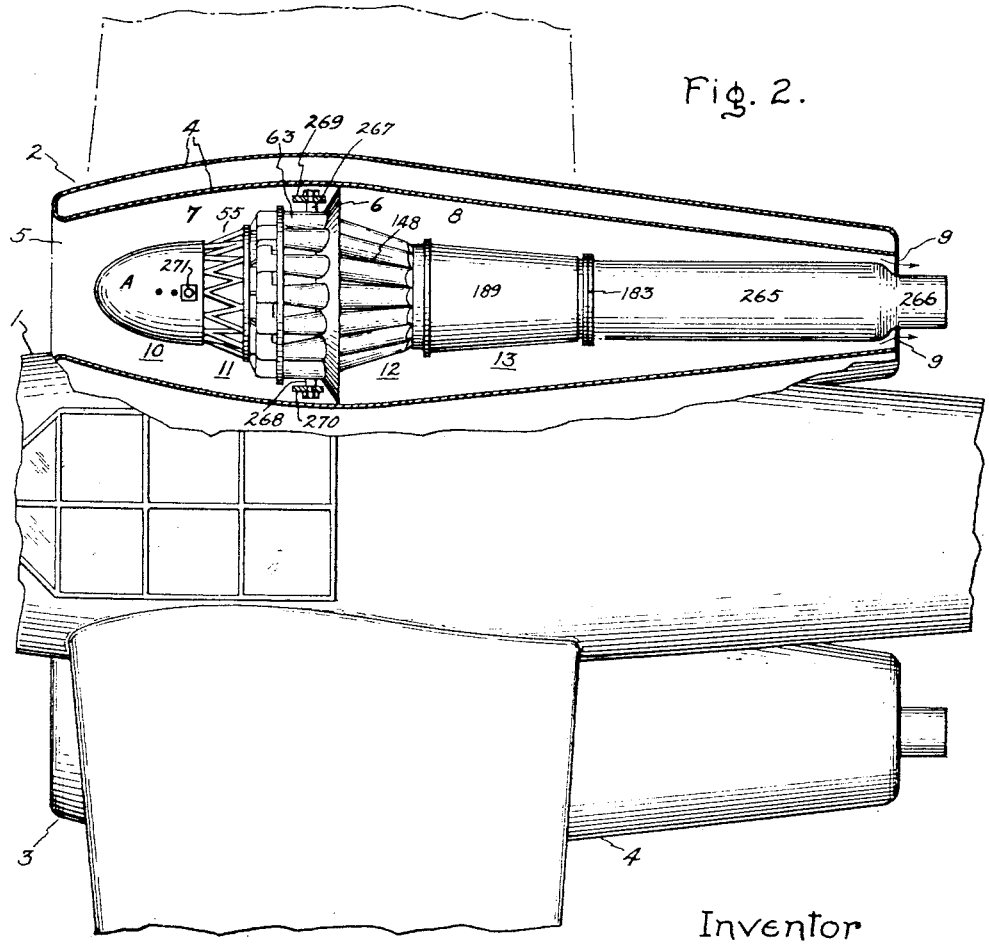

In the drawing, Fig. 1 is a perspective view of an aircraft equipped with two power plants embodying my invention; Fig. 2 is a top plan view of a portion of the aircraft shown in Fig. 1, the nacelle for one of the power plants being shown in section; Fig. 3 is a perspective view of one of the power plants, the exhaust pipe and the exhaust discharge nozzle being omitted; Fig. 4 is a detail perspective view of a part of a support for the power plant; Fig. 5 is a view, partly in section, of what may be termed the auxiliaries section of the power plant; Fig. 6 is a somewhat diagrammatic view of gearing utilized in driving the starting fuel oil pump and the main fuel oil pump; Fig. 7 is a sectional view of fuel oil control valves; Fig. 8 is a sectional view of what may be termed the compressor section of the power plant; Fig. 9 is a detail view of diffuser and air discharge conduits for the compressor taken on line 9—9 in Figure 8; Fig. 10 is a detail sectional view of a fuel line valve; Fig. 11 is a sectional view of what may be termed the combustion and turbine section of the power plant, and the adjacent forward portion of exhaust collector or turbine exhaust section; Fig. 12 is a detail sectional view of adjacent combustion chambers looking in the direction of the arrow 12, Fig. 11; Fig. 13 is a detail view of a tie rod arrangement; Fig. 13ᵃ is a sectional view looking in the direction of arrow 13ᵃ in Fig. 11; Fig. 14 is a sectional view of what may be termed the exhaust collector or turbine exhaust section of the power plant, and Fig. 15 is a sectional view taken on line 15—15, Fig. 14.

Referring to the drawing, 1 indicates an aircraft on which are mounted power plants embodying my invention. In the present instance, the aircraft is shown as being provided with two power plants, one on each side of the body of the aircraft as is indicated at 2 and 3. It is to be understood that an aircraft may be equipped with a single power plant or with more than two power plants as may be found desirable. Also, the power plant may be used in an aircraft in connection with other types of power plants. Each power plant is mounted in a casing defined by walls 4 and in spaced relation to such walls. At its forward end, the casing defined by walls 4 is provided with an air admission opening 5 which faces in the direction of flight. In the casing is a baffle 6 which surrounds the power plant and at its outer end engages closely the inner surface of wall 4 to define a plenum chamber 7 into which air is rammed during flight to build up a pressure in the chamber, the value of which depends upon the speed of the aircraft and the efficiency of the inlet in converting the air relative velocity into pressure. Beyond baffle 6 as regards the direction of flight is a chamber 8 which connects with the atmosphere through rear openings or louvers 9. Each power plant comprises four sections, an auxiliaries section 10, shown particularly in Fig. 5, a compressor section 11, shown particularly in Fig. 8, a combustion chamber and turbine section 12, shown particularly in Fig. 11, and an exhaust collector or turbine exhaust section 13, shown particularly in Fig. 14. Each of these four sections is a unitary or integral assembly complete in itself. The power plant is formed by fastening together the four sections or assemblies. In each of Figs. 5, 8 and 14, there is shown in dot-dash lines and in Fig. 11 in dot-dash lines on the left hand side of the drawing and in full lines on the right hand side, portions of adjacent sections to illustrate more clearly the way in which the sections are connected together.

The compressor is of the centrifugal type. Referring particularly to Fig. 8, 15 indicates the impeller of the compressor. It comprises a hub and a tapered web to which on opposite sides are attached the impeller vanes 16, thus providing a double sided impeller, i. e., an impeller to which air is supplied from each side. The vanes are suitably shaped to receive air at their inlets 17 and to discharge it at their peripheries 18. Attached to the hub on opposite sides are front and rear impeller shafts 19 and 20 by means of suitable studs 21. The front impeller shaft 19 is mounted in a ball bearing 22 carried on a front bearing support 23. The bearing support 23 comprises a curved annular wall made in one piece and provided with suitable reinforcing ribs 23ª. At its periphery, it is shaped to provide an annular bolting flange 24. The inner race of ball bearing 22 is mounted between an oil slinger 25 on shaft 19 and a spacing sleeve 26 held in place by a nut 27 which threads onto the end of the shaft and which is locked by a lock washer 27ª. The outer race of the bearing is supported in a sleeve 28 mounted in an opening in bearing support 23 and arranged to slide axially in the opening. Sleeve 28 projects beyond the outer wall of the support 23 and on its outer side is threaded to receive an adjusting nut 29. By turning nut 29, the bearing may be adjusted axially on the bearing support, sleeve 28 sliding axially in the opening in which it is located. When adjusted to the desired position, the nut 29 is fixed in place by bolts 30, thus rigidly fixing the bearing in its adjusted position. Oil slinger 25 is fixed on impeller shaft 19. It comprises an annular curved tooth which provides an annular pocket adjacent to the right hand side of the ball bearing and an axially extending sleeve which has an outer surface which runs with a close clearance with respect to labyrinth grooves on a sleeve 31 fixed to front bearing support 23. The curved tooth serves to direct radially outward oil flowing from the ball bearing and the labyrinth packing grooves in sleeve 31 serve to prevent leakage of oil from the space adjacent to the right hand side of the bearing.

Rear impeller shaft 20 is supported in a roller bearing 32 mounted in a rear bearing support or wall 33 similar to front bearing support 23, and shaped at its periphery to provide an annular bolting flange 34. The inner race of the bearing is held between an oil slinger 34ª on shaft 20 and a coupling hub 35 also on shaft 20. Oil slinger 34ª may be similar to oil slinger 25. For this reason, these parts are not shown in section. Coupling hub 35 is provided with a toothed portion 36 which forms a part of a gear coupling. It is held in place on the shaft by a nut 36ª which threads onto the end of shaft 20 and is locked by a lock washer 36ᵇ. The outer race of roller bearing 32 is carried in a sleeve 37. It is clamped into this sleeve by a clamp washer 37ª. Sleeve 37 and washer 37ª are held in place by bolts 38. The inner surface of the outer bearing race with which the rollers of the bearing engage is a straight flat surface so that the rollers may slide axially thereon. By making the ball bearing 22 axially adjustable in its holder and the roller bearing so that the rollers can move axially along the inner surface of its outer race, the compressor impeller can be adjusted readily relatively to the casing walls by removing bolts 30, and turning nut 20 to effect axial movement of the ball bearing and with it the impeller. And when the impeller is correctly centered, it can be fixed in position by replacing the bolts 30. Rear bearing support 33 is provided with strengthening ribs 39 similar to the strengthening ribs 23ª on the front bearing support or wall 23.

On opposite sides of the impeller are impeller front and rear casing walls 40 and 41. These are complete annular walls and are provided with strengthening ribs 42. They are connected together at their peripheries by a diffuser and air directing structure comprising a pair of side walls 43 and 44 between which are located the curved diffuser vanes 45. Side walls 43 and 44 have side flanges 46 and 47 which rest on flanges 48 and 49 formed integral with walls 40 and 41 and to which they are attached by studs 50. As best shown in Figs. 9 and 3, the end between each two diffuser vanes is closed by an end wall 51 and in each instance side wall 44 terminates short of the end of its opposite side wall 43 to define a rearwardly facing air discharge opening 52. This gives a sort of saw tooth appearance to the outside of the diffuser as shown in Fig. 3. Thus there is a rearwardly facing discharge opening from the space between each two adjacent diffuser vanes 45. Each opening 52 is defined by a short rearwardly extending wall section surrounded by a bolting flange 53. At 54 are curved vanes for turning the air around the corner and directing it axially toward openings 52. A suitable number of the air passages, for example two (see Fig. 3) may be provided with suitable opening to which are connected pipe lines 54ª for supplying air for cabin supercharging.

Between bearing supporting walls 23 and 33 and compressor casing walls 40 and 41 are arranged front and rear truss rings 55 and 56. Each truss ring comprises annular rings 57 and 58 between which are located spaced angularly extending (see Fig. 3) bars 59 connected at intermediate points by a strengthening ring 60. Bars 59 and strengthening ring 60 are curved and streamlined in cross section so as to interfere to a minimum with flow of air past them. Ring 57 in each instance is bolted to the peripheral flange portions 24 and 34 of the adjacent walls 23 and 33 by rings of bolts 61 and 61ª, respectively. Rings 58 are fixed to flanges 48 and 49 by the studs 50 which fasten the diffuser structure in place.

Attached to each flange 53 by bolts 62 is an air adapter 63 which at its rear end is provided with a flange 64. Between flange 53 and the end of air adapter 63 is a spacing ring 65. Baffle 6 is bolted to flanges 64 by bolts 66.

Attached to bearing supporting walls 23 and 33 and compressor casing walls 40 and 41 are curved walls 67, 68 and 69 which define curved passages for directing the flow of air to the entrance edges of the impeller, wall 68 serving as a guide vane positioned between walls 67 and 69. In each instance, wall 68 is attached to wall 69 by straps 70 which may be suitably curved to direct the flow of air through the annular passage between walls 68 and 69. Walls 67 at their outer and inner ends are attached to bearing supporting walls 23 and 33 by suitable bolts as is indicated at 71 and 72. Walls 69 are attached to compressor casing walls 40 and 41 by rings of bolts as is indicated at 73, the walls 69 being provided with flanges welded thereto through which the bolts 73 pass. Across the air admission ends of the spaces between walls 67, 68 and 69 are fastened suitable screens 74. It will be noted that the inlet end of the passage between walls 68 and 69 is a greater percentage of the inlet area than the exit end is of the exit area. By this arrangement, a relatively larger proportion of the air is supplied to the radially outer portion of the impeller vanes, such portions being capable of doing more work than the radially inner portions.

When the parts are bolted together, the bearing supporting walls 23 and 33, the front and rear truss rings 55 and 56, the diffuser comprising side walls 43 and 44, the diffuser vanes 45 and the compressor casing walls 40 and 41 form a unitary structure. This structure is quite rigid, it being designed as rigidly as possible while keeping the weight to a minimum. However, there is some flexibility in the structure between the bearing supporting walls 23 and 33. Because of this flexibility, the outer races of the bearings 22 and 32 may not be perfectly lined up during the original assembly and will tend to move relatively to each other when shock loads or other external loads are applied to the unit. In order to accommodate any misalignments or any slight motions, the ball bearing is provided with a spherical seat on its outer race so that it will automatically line itself up. Similarly, the roller bearing is provided with either a crowned outer race and flat rollers or a flat outer race and crowned rollers so that it too can line itself up. With this arrangement of bearings, any slight misalignments or slight motions of the bearings relatively to each other are readily taken care of.

In the discharge end of each air adapter 63 is a combustion chamber dome or end cap 75 supported on the wall of adapter 63 by a number of circumferentially spaced brackets 75ª, for example three, and also on the end of a fuel nozzle 76, the end of the fuel nozzle being located inside the cap. The fuel nozzle is mounted on the end of a boss 76ª formed integral with and projecting into air adapter 63, the boss being provided with a suitable passage with which a fuel pipe 77 connects.

Impeller shaft 19 is hollow and splined inside it is one end of a quill coupling shaft 78, the other end of which drives the gearing which operates the auxiliaries, as is shown and will be hereinafter described in connection with Fig. 5.

The rear ends of air adapters 63 are tied to ring 57 by straps 79 fixed in place by certain of the bolts 61ª and 66. Also supported by certain of the bolts 66 is an annular cone-shaped air baffle 69ª.

The compressor structure is a unitary assembly complete in itself and as will be noted all its walls are one piece annular disks or rings. They may be assembled by positioning them axially with respect to the impeller and its shaft and bolting them together. Thus, I avoid the necessity of having to provide any casing parts which must be split axially to enable them to be assembled. By the use of casing walls and other parts which are not split axially, I am enabled to provide a casing having the required strength which is lighter in weight than would be otherwise the case.

Referring particularly to Fig. 11, the turbine wheel is indicated at 80 and the ring of buckets at 81. The buckets may be attached to the web of the wheel in any suitable manner such as by welding as is indicated at 82. The turbine wheel is carried on the end of a shaft 83 which may be integral with the hub of the wheel or may be attached to the hub of the wheel by being welded or bolted thereto. Shaft 83 is journaled in a pair of spaced bearings 84 and 85 mounted in the end walls of a suitable bearing support and housing 86.

The bearing support and housing 86 comprises an annular wall 87 having a bell-shaped front end 88 which is tied to the rear end by a number of circumferentially spaced axially extending struts which are T-shaped in cross section, the flange being indicated at 89 and the head at 89ª. These struts may be formed integral with wall 87. Between the struts are openings 90. The outer edge of front end 88 terminates in an annular bolting flange 91. At its lower side, wall 87 is provided with a downwardly projecting portion 92 which extends through the opening 90 between the adjacent struts to form a lubricating oil pocket or sump 93 having at its lowest point a discharge opening 93ª. The bottom wall of sump 93 is indicated at 94. Viewed from another aspect, the sump is formed by a downward depression at the lowest portion of annular wall 87. Wall 94 slopes downwardly as is shown clearly in Fig. 11 so that lubricant from bearings 84 and 85 will flow down the wall to the discharge opening 93ª. At 95 are suitable strengthening ribs for the forward end of wall 87. Forward bearing 84 is shown as a ball bearing. Its inner race is mounted on the shaft and is held against a shoulder on the shaft by a sleeve 96 which carries a toothed coupling hub 97 and which is fixed on the shaft by a nut 98 locked by lock washer 98ª. The outer race of bearing 84 is fixed in a sleeve 99 by a nut 100. Sleeve 99 is slidably mounted in an opening in a web 101 formed integral with wall 87 and projecting inwardly therefrom, it being provided with an enlarged head in which the sleeve 99 is located. Web 101 is provided with circumferentially spaced holes 101ª. The left hand end of sleeve 99 projects beyond this head and is threaded to receive a threaded adjusting nut 102 which is fixed to the enlarged head of the web by a ring of bolts 103. By turning adjusting nut 102, bearing 84 can be adjusted axially with respect to web 101. The inner race of roller bearing 85 is fixed on shaft 83 between an oil slinger ring 104 and a sleeve 105 held in place by a nut 106 which threads onto a threaded portion on the shaft and is locked by lock washer 106ª. The outer race of the bearing is carried in a race holder 107 attached to an inturned flange 108 on inner wall 87. The outer race is clamped in the race holder 107 by a clamp washer 107ª. The race holder and washer are held by bolts 107ᵇ. The inner surface of the outer race with which the rollers engage is a flat straight surface similar to that of roller bearing 32 so that by adjusting ball bearing 84 axially the turbine wheel may be adjusted to position it relatively to adjacent parts to give the desired clearances.

The rear ends of struts 89 terminate in and are united by an integral annular wall or ring 108ª which is connected to the rear end of wall 87 by a number of circumferentially spaced webs 108ᵇ between which are passages 109.

Attached to inturned flange 108 is a cap 110 to which is attached a packing ring 111 which seals against an outer surface of oil slinger 104, it being provided with labyrinth teeth to prevent flow of lubricating oil past it. It defines on the rear side of roller bearing 85 an annular pocket 112 which is connected with the oil sump 93 by circumferentially spaced openings 113. Connected to cap 110 by circumferentially spaced webs 114 which line up with webs 108ᵇ is an angularly shaped wall 115 which at its peripheral portion carries a series of curved diffuser vanes 116. The space between cap 110 and wall 115 communicates with the passages 109 formed between the right hand end of wall 87 and ring 108ª. Attached to the web of turbine wheel 80 are a series of impeller vanes 117. The impeller vanes 117 in combination with diffuser vanes 116 form a centrifugal compressor to effect circulation of air for cooling the turbine wheel. This air flows in through openings 90 and thence through passages 109 and the passage between cap 110 and wall 115 to the inner or inlet ends of impeller vanes 110. Rotation of the turbine wheel causes this air to flow outwardly where it is discharged from the peripheral ends of the vanes to the passages between the diffuser vanes 116. In passing through the passages between the diffuser vanes, velocity of the air is converted into pressure and such air is discharged into an annular space 118.

Formed integral with ring 108ª and the rear ends of struts 89 is an annular bolting flange 119 to which is attached by a ring of bolts 120 a sub-assembly which comprises the combustion chambers of the power plant, there being a series of combustion chambers arranged circumferentially around the bearing housing in spaced relation to the bearing housing and to each other. This sub-assembly comprises an outer ring 121 having a bolting flange 122 and an inner ring structure comprising two rings 123 and 124 connected to each other by webs 125. The inner ring 124 is attached to bolting flange 119 by the ring of bolts 120. Suitably attached to rings 121 and 123 are the discharge portions 126 of the burner casings. The discharge ends 127 of discharge portions 126 are flattened as is indicated at 128 in Figs. 11 and 13ª and are of an extent circumferentially such that the discharge ends meet each other to form in substance an annular discharge passage from the combustion chambers. The remaining portion of each combustion chamber is formed by a tubular wall 129 which is suitably fastened to wall portion 126 and at its forward end is provided with a bolting flange 130. Bolting flange 130 is connected to wall portion 129 by a bellows or other type of flexible connection 130ª to permit of expansion of wall portion 129 relatively to the flange and the part to which the flange is bolted. In the present instance, the flexible connection comprises an annular U-shaped member having on opposite sides flanges which are welded one to the flange 130 and the other to the wall portion 129. This permits the combustion chamber wall to expand and contract relatively to the flange and at the same time provides a smooth interior for the flow of air. Inside each combustion chamber casing is a liner which is shown as being formed in two sections, a rear section 131 and a forward section 132, suitably connected together. The section 132 is provided with holes 133 for the admission of air to the interior of the liner. At its forward or admission end, the liner is held in spaced relation with respect to the casing wall 129 by circumferentially spaced perforated webs 134. At its rear or discharge end, it is held in spaced relation to the casing wall 126 by buttons 135 which may be welded on the outside of the liner. The liner is attached to the casing by a single bolt 136 which threads through an opening in the casing into the liner. By removing the bolt 136, the liner can be removed axially from the casing. This type of combustor is more fully described in an application, Serial No. 750,015, filed May 23, 1947, a continuation of Serial No. 501,106, filed September 3, 1943, in the name of Anthony J. Nerad and assigned to the same assignee as the present application.

Connected to the ring 123 by a ring of bolts 138 is a nozzle structure comprising inner and outer rings 139 and 140 connected by curved nozzle partitions 141 which direct the hot combustion products onto the turbine wheel. On the inner side of ring 139 there is welded an angle ring 142 through which bolts 138 pass in attaching the nozzle ring to ring 123. The nozzle ring is directly in front of the discharge ends of the several combustion chambers and are adapted to receive gases from them and direct them to buckets 81 of the turbine wheel. Between outer ring 140 and ring 121, there is inserted a heat-resisting packing 143 of suitable material. By the above construction, it will be seen that there is provided a sub-assembly comprising the several combustion chambers and the nozzle ring all rigidly connected together and having the bolting flange 122 and bolting ring 124. This sub-assembly as a unit is adapted to be attached to flange 119 on the bearing housing and support by the bolts 120 as already described. Attached to ring 142 is an annular packing ring 144 having two tongues which have close clearance with the rim of the turbine wheel to prevent flow of air from chamber 118 into the gas stream as it passes from the nozzles to the bucket ring or vice versa. Surrounding the bucket ring and having a close clearance therewith is a turbine wheel shroud band 144ª which is rabbeted onto the outer ring 140 as is indicated at 144ᵇ and expands and contracts radially therewith. The shroud band will operate at about the same temperature as the turbine wheel and buckets and the close clearance between the outside diameter of the turbine buckets and the shroud band will be maintained when the engine is running hot. A similar shroud arrangement is more fully disclosed in an application Serial No. 525,388, filed March 7, 1944, in the name of Donald F. Warner.

Cooling air from chamber 118 flows out between rings 123 and 124 to an annular space 145 defined by annular wall 146 and a baffle 147 suitably attached to struts 89 as shown clearly in Fig. 11. Space 145 communicates with the spaces 148 between the several combustion units (see Figs. 2 and 3) so that air can flow from annular space 145 out through spaces 148 into the space 8.

Ring 121 is tied to the flange 91 by a series of circumferentially spaced straps 149 shown in detail in Fig. 13. These straps are formed from material having practically zero coefficient of expansion so as to tie ring 121 and flange 91 rigidly together and hold them in fixed relation axially relatively to each other, independent of heat from the air or radiated from the combustion chambers. As shown particularly in Fig. 3, there is a strap provided between each of the combustion chambers.

Each strap 149 comprises preferably two sections, a rod section 150 and a flat strip section 151 suitably pivoted together by a yoke and tongue connection 152. The strap section is provided so that a member of the desired strength can be utilized which will pass between adjacent combustion chamber casings. The rod section is provided so that it can pass through small holes in baffle 147. At opposite ends, the tie straps are provided with U-shaped pivoted yokes or heads 153 and 154. Each yoke 153 carries a threaded stud 155 which screws into flange 91 and has a threaded axially extending opening into which an end of a bolt 61ª screws. Ring 57, at the points where studs 155 are located is provided with enlarged bosses 155ª to strengthen the structure. Each yoke 154 carries a threaded stud 156 which extends through flange 122 and an adjacent flange hereafter referred to and has suitable nuts thereon.

Baffle 147 is curved outwardly as shown particularly in Fig. 11 to provide an air chamber 157 through which cooling air flows to the forward ends of openings 90. Wall 146 forms a shield over the rear portion of struts 89 to define a conduit for conveying cooling air directed through the forward ends of openings 90 by baffle 147 to the passages 109.

Formed on the inner side of wall 87 is a web 158 in which is an oil passage 159 with the opposite ends of which are connected oil discharge nozzles 160, 161 and 162. Nozzle 160 supplies lubricant to roller bearing 85. Nozzle 161 supplies lubricant to ball bearing 84 and nozzle 162 supplies lubricant to the gear coupling. At 163 is a cross web having a passage 164 which at one end communicates with oil passage 159 and at the other end communicates with an oil pipe 165.

As shown in Fig. 12, the interiors of the several combustion chamber casings 129 are connected together by tubes 170 and extending through tubes 170 are smaller tubes 171 which connect together the interiors of the liners 132. Combustion is started by providing one or two of the combustion chambers with ignition plugs. An ignition plug for one of the combustion chambers is shown at 137 in Fig. 8, it being suitably associated with a dome 75 as shown. In starting, burning starts first in the combustion chamber or chambers having ignition plugs; from these combustion chambers the other combustion chambers are quickly ignited by flame passing through the tubes 171.

The teeth on coupling gear 97 are crowned and are engaged by curved teeth at one end of a coupling sleeve 172. And on this end of the sleeve is fastened an oil shield ring 173. The other end of coupling sleeve 172 is provided with straight coupling teeth 174 adapted to engage the crowned coupling teeth 36 on centrifugal compressor impeller shaft 20. By making teeth 174 straight, they may slide on teeth 36 to permit of axial movement of the compressor rotor and the turbine rotor relatively to each other. And by making the teeth 36 and 97 crowned, limited axial misalignment of the two rotor shafts is permitted.

The exhaust gas collector comprises an outer tubular wall 175 provided with reinforcing ribs or fins 176 and an inner cone-shaped wall 177 provided with reinforcing ribs or fins 177ª and held in place in and in spaced relation to outer wall 175 by cross struts 178 to provide an annular discharge passage 179. In the present instance, three sets of struts each comprising two tie rods arranged at a right angle to each other are shown. At their centers they are tied together by a tubular rod 180 to prevent vibration of the cross struts. Surrounding the portions of the struts located in annular passage 179 are elongated streamlined spiders 181 which serve to direct the flow past the rods with a minimum of disturbance. The forward end of wall 175 is provided with a reinforcing ring and bolting flange 182 and its rear end is provided with a reinforcing ring and bolting flange 183. The inner wall 177 is provided at its forward end with a reinforcing ring 184 and at its rear end with a reinforcing nose 185 into which the end of the rod 180 is threaded. At 186 is a heat insulating shield for the discharge side of the turbine wheel. At its center it is slidably mounted on the front end of tie rod 180 and at its periphery it is bolted to reinforcing ring 184. Certain of the reinforcing ribs 176 on wall 175 are provided with angle posts 187 welded thereto and to which there is fixed by studs 188 a light polished metal covering 189 to form a heat insulating shield to minimize escape of heat from passage 179 through wall 175 to adjacent aircraft parts. Between wall 175 and covering 189 are air spaces 190 from which, if found desirable, heated air may be withdrawn for heating purposes on the aircraft, such as for cabin heating, deicing, defrosting or the like.

Referring now particularly to Fig. 5, the auxiliaries section comprises an annular casing wall 200, the rear end of which is open and is surrounded by a bolting flange 201 and the forward end of which is closed by an end wall 202. Depending from the inner surface of casing wall 200 are a plurality of circumferentially spaced ears 203 (only one of which shows in the drawing) to which is bolted two spaced-apart disks 204 and 205 held in spaced relation to each other by posts 206 through which pass the bolts which attach the disks to ears 203. Carried by disks 204 and 205 are bearings for gear wheels through which the several auxiliaries are driven from the turbine wheel. At the central portions of disks 204 and 205 are ball bearings in which is supported a hollow shaft 208 on which is a main driving pinion 209. In its interior, shaft 208 is provided with teeth or splines 209ª with which a toothed or splined head 209ᵇ on shaft 78 (Fig. 8) connects, thus connecting shaft 208 to the compressor impeller and hence to the turbine wheel 80. Meshing with pinion 209 are suitable gear trains for the several auxiliaries, some but not all of which appear in the drawing. Those which appear in the drawing are a generator 210, a tachometer 211, a scavenging pump and an oil feed pump for the lubricating system, both located in the same casing 212, a starting motor 220, and a main fuel pump 213 which supplies fuel oil to the several combustion chambers. The several auxiliaries are suitably attached to pads on wall 202, a sufficient number of pads being provided and so located that the desired auxiliaries for any particular installation may be readily positioned thereon.

Formed integral with disk 204 is an annular housing 214 which at its outer end supports a ball bearing 215. Mounted in bearing 215 and an adjacent bearing 216 located in a cone-shaped protuberance on wall 202 is a shaft 217. Shaft 217 is connected to shaft 208 by a suitable overrunning clutch 218 located in housing 214. On shaft 217 is a main gear 219 with which meshes a pinion 220ª on the shaft of starting motor 220. Also meshing with gear 219 is a pinion 221 which drives a starting fuel pump 222. Starting fuel pump 222 does not show in Fig. 5. It is shown in a diagrammatic view, Fig. 6. As indicated in dotted lines in Fig. 5, wall 23 has its flange 24 bolted directly to bolting flange 201 by bolts 61. Thus, wall 23, side wall 200 and end wall 202 form a chamber 223 in which the lubricating oil supply is carried. The level of the lubricating oil supply in the chamber is indicated by the dot and dash line 223ª. That the gearing located between disks 204 and 205 may not be required to run directly in the lubricating oil, the space between the two disks is sealed by a cover plate 224 which extends around the bottom of the two disks and up along their sides to a point well above the oil level 223ª. At the lowest point, plate 224 is provided with one or more restricted openings 225 through which lubricating oil may pass at a limited rate to lubricate the teeth on the gear trains between the two disks. Openings 225 are of a size such that only sufficient oil to lubricate the gears will flow through them. Certain of the gears, such as gears 219 and 221, run directly in the lubricating oil but this is not of importance since these gears are in operation only during the starting of the unit after which they are cut out of operation by the overrunning clutch 218. In Fig. 5, 226 indicates an electrical pressure transmitter and 227 indicates a lubricating oil filter.

An accessory drive arrangement which is similar in some respects to that shown in Fig. 5 is more fully disclosed in an application, Serial No. 525,389, filed March 7, 1944, in the name of Donald F. Warner.

The several auxiliaries which are carried by wall 202 and the casing which encloses the gears are all enclosed in a dome A which presents a forward rounded end for directing flow of air over the power plant to the region of the plenum chamber 7 which surrounds the compressor inlet.

Referring now particularly to the lubricating system, lubricating oil from the supply chamber 223 flows through passage 228 to the lubricating feed pump in casing 212 and thence out through pipe line 229 to a branch coupling 229ª. One opening of coupling 229ª is connected to a main feed line 230. In feed line 230 are a series of couplings 231 and 232 and a coupling boss 233 on flange 34, the latter being shown in Fig. 8. Bearing 28 is supplied with lubricant from feed line 230 through a branch pipe line 234, passages 235 and a discharge nozzle 236. Bearing 32 is supplied with lubricant from coupling boss 233 through a passage 237 and a discharge nozzle 238. The lubricant pipe line 165, which supplies lubricant to the bearings for the turbine shaft and to the coupling which connects the turbine shaft to the compressor wheel, is suitably connected to feed line 230 as is indicated at 239, forming a branch of feed line 230. Another opening of coupling 229ª is connected by a pipe line 240 to oil filter 227 from which leads a pipe line 241 to supply lubricant through the interior of shaft 217 to a nozzle 242 which in turn supplies lubricant to the center of quill shaft 78 from which it is supplied to the teeth, the two coupling splines and to overrunning clutch 218. Another opening of coupling 229ª is connected by a pipe line 243 to an electric pressure transmitter 226 from which lead wires 244 go to a suitable pressure indicating instrument (not shown) which may be located at the control panel for the power plant.

The drive for the starting fuel oil pump and main fuel oil pump is shown diagrammatically in Fig. 6. The main fuel oil supply pipe is indicated at 245. It may lead from any suitable supply of fuel oil. It is connected by a branch pipe 246 directly to the inlet of the main fuel oil pump 213 and by a branch pipe line 247 to the inlet of the starter fuel oil pump 222. The discharge pipe of main fuel oil pump 213 is indicated at 248 and from the pump it leads to the inlet side of a suitable control valve mechanism 249 which is adjusted to regulate the flow of fuel to the several combustion chambers. It may be of any suitable type. It is not shown in detail as its specific structure forms no part of my present invention. It may comprise two suitable valves 249ª and 249ᵇ (Fig. 7) which are arranged in a single casing in series as regards the flow of oil, the oil flowing first through valve 249ª to a space 249ᶜ and from space 249ᶜ through valve 249ᵇ to pipe line 252. The valves may be actuated by control rods 249ᵈ and 249ᵉ which connect with control levers (not shown). Valve 249ᵇ may be a stop valve which is opened and closed when starting and stopping the power plant and valve 249ª may be a control or throttle valve which is positioned to regulate or meter the volume of fuel oil flow. To advantage, the valve control mechanism may be similar to that shown in the application of Austin G. Silvester, Serial No. 525,416 filed of even date herewith and assigned to the same assignee as the present application. The discharge side of the starter fuel oil pump 222 is connected by a pipe line 250 to pipe line 248, there being provided a non-return valve 251 in pipe line 250 to prevent flow of oil from pipe line 248 through pipe line 250 to the starter pump. The discharge side of the combined stop cock and throttle valve 249 is connected by a pipe line 252 to an annular header in the form of a pipe 253 (see Figs. 3 and 8). Header 253 is fastened in position by suitable tie straps 253ª. The pipe lines 77 through which fuel oil is supplied to the nozzles 76 of the combustion chambers are connected to the annular header 253. At the lowest point of header 253 is a drip valve 254 shown in section in Fig. 10. It comprises a ball valve 255 which is normally held in engagement with a seat 256 against the action of a spring 257 by the pressure of the oil in the fuel oil feed line. When the fuel oil pump shuts down, relieving the pressure in the pipe line, ball valve 255 opens to permit the oil in the annular pipe line 253 to drain away through a pipe line 258 to any suitable point. At 259 is a breather pipe for the gear casing and lubricant chamber. It extends back through baffle 6 so that vapors escaping through it are discharged to chamber 8 whence they pass to atmosphere through openings 9. Referring to Fig. 5, it will be seen that breather pipe 259 connects to the auxiliaries casing at a point above the normal oil level in the lubricant reservoir. And since the breather pipe extends radially to the top of the auxiliaries casing and thence rearwardly across its top, leakage of lubricant through it cannot occur no matter what position the auxiliaries casing may be tipped to.

In connection with the combustion chambers located around the lower half of the power plant, there are provided drain pipes 260 which connect with a semicircular drain pipe 261 to the lowest point of which is connected a drip pipe 262 in which is a drip valve 263 which may be similar to drip valve 254. When the power plant is shut down, these pipes serve to drain away any fuel which may accumulate in these combustion chambers. Drainage means is not needed for the combustion chambers around the upper half of the power plant since they slope downwardly toward the nozzle ring and any fuel oil in them will drain away through the nozzle ring. A similar combustion chamber drain arrangement is more fully described in an application Serial No. 596,955, filed May 31, 1945, in the name of William W. Kuyper.

When the four sections shown in Figs. 5, 8, 11 and 14 are bolted together, they form the unitary structure shown in Fig. 3. The auxiliaries section (Fig. 5) is bolted directly to the forward end of the compressor section (Fig. 8) by bolts 61, the bolts extending through annular ring 57 and flanges 24 and 201. Coupling shaft 78 passes into hollow shaft 208, the splined or toothed head 209$^b$ engaging with the splines or teeth 209$^a$.

The combustion and turbine section is bolted directly to the rear end of the compressor section by bolts 61$^a$ as indicated by the dotted lines shown at the right hand side of Fig. 8 and the left hand side of Fig. 11, and the air adapters 63 are bolted to the combustion chambers.

The exhaust collector is bolted to the rear end of the combustion and turbine section by bolts 156 (Fig. 13) and by bolts 156$^a$ located between bolts 156 (see Fig. 3), as shown in full lines in Fig. 11.

In the installation in the aircraft (see Fig. 2) there is bolted to the rear end of the exhaust collector an extension or exhaust pipe 265, at the end of which is a nozzle 266 of suitable size which projects out through the end wall of casing 4 so as to discharge directly to atmosphere.

The power plant may be mounted in the aircraft by two diametrically opposed rigid central supports 267 and 268 which at their inner ends are fixed to flanges 57 and 58 and at their outer ends are bolted directly to suitable beams 269 and 270 which form parts of the aircraft framework, and by a forward top support 271 (Fig. 2), thus providing a three point support. The two supports 267 and 268 are alike. The latter is shown more in detail in Figs. 3 and 4. It comprises a bar 272 which at its inner end is bolted directly to a post 273 which forms a part of flange 57. At an intermediate point, bar 272 has two angularly extending arms 274 which are bolted to flange 58. The forward top support 271 (Figs. 3 and 5) comprises a link having balls 275 and 276 at its inner and outer ends. Ball 275 is fixed in a suitable socket 277 carried by casing wall 200 and ball 276 is fixed in a suitable socket carried by a suitable part of the aircraft frame. The forward ball and socket connection serves to steady the power plant on its two main supports 267 and 268.

The power plant is started by electric motor 220. To start the power plant, a circuit is closed on the ignition plug and on the starting motor. The starting motor turns starting gear 219 which through direct gearing 221 drives the starting fuel pump 222 and through the overrunning clutch 218 drives the compressor impeller, the turbine wheel, the main fuel pump 213, the lubricating pumps, and other auxiliaries. While the motor is bringing the impeller up to starting speed, the stop valve 249$^b$ is left in closed position so no fuel is supplied to the combustion chambers. The regulating valve 249$^a$ is moved to idling position permitting chamber 249$^c$ to fill with oil. Sufficient time is permitted for motor 220 to bring the impeller up to starting speed so that it is supplying air to all the combustion chambers, after which the stop valve 249$^b$ is opened wide. This permits fuel to be supplied to the combustion chambers. Immediately combustion starts in those combustion chambers provided with ignition plugs 137, and from such combustion chambers ignited fuel or flame spreads quickly through the tubes 171 to the adjacent combustion chambers to start burning in all of them. The products of combustion are directed by the ring of nozzles to the buckets of the turbine wheel. Thus, the turbine wheel is driven by the gases and at gradually increasing speed as the supply of gases and the pressure build up. Very quickly the speed of the turbine wheel and the compressor will exceed that at which the starting motor operates, the overrunning clutch 218 functioning to permit the turbine wheel compressor to rotate at such higher speed. The power plant is now started and the current to the starting motor and the ignition plugs may be cut off and they can stop until needed for starting again. Having been started, the speed of the turbine wheel and compressor is controlled by moving regulating valve 249$^a$ to increase and decrease the amount of fuel supplied to the combustion chambers. By reason of the annular header 253 to which the branch pipes 77 are connected, the fuel is evenly distributed to each of the fuel nozzles.

When the lubricant pump starts operating, it draws lubricant from lubricant supply chamber 223 in the auxiliaries housing through conduit 228 and delivers it through pipe 229 and branch pipes 230 and 240. Lubricant from pipe 240 flows through filter 227 and pipe 241 to nozzle 242 to lubricate the parts supplied by this nozzle. From such parts, the lubricant flows back to the supply chamber 223. Thus the portion of the lubricant supplied to nozzle 242 is filtered.

Branch pipe 230 supplies lubricant to the two compressor rotor bearings, the two turbine rotor bearings and to the coupling between the compressor and turbine rotors. Lubricant from ball bearing 22 flows back directly to the lubricant chamber 223 as this ball bearing is located in such chamber. Lubricant from roller bearing 32 and from ball bearing 84 and roller bearing 85 flows down into the sump 93 from which it is pumped back to the lubricant chamber by the scavenging pump through a pipe line 280 which connects discharge opening 93$^a$ to the inlet of the scavenging pump, the outlet of which is connected by pipe line 281 to lubricant chamber 223.

Lubricant nozzle 162 supplies lubricant to the coupling between turbine shaft 83 and compressor shaft 20. This lubricant is discharged against the side of the coupling hub 97 and is carried radially outward behind the shield 173 and thence flows axially through the interengaging teeth of the coupling to the interior of the coupling sleeve. Due to centrifugal force, the lubricant is retained in contact with the inner wall of the coupling sleeve and flows along such wall to the left hand end of the coupling where it flows through and serves to lubricate the coupling teeth 36, flowing from there back into the lubricant sump 93.

Upon starting up, the space between disks 204 and 205 in the auxiliaries casing will contain lubricant up to the lubricant level in the chamber 223, the lubricant having flowed in through opening 225. Shortly after starting this lubricant will have been pumped out of such space by the "oil-slinging" effect of the gearing, after which only sufficient lubricant will flow through the restricted opening 225 to lubricate the gears between the disks. This pumping action is effected by the rotation of the gear which picks up the oil from the lower portion of the casing and discharges it in a vertical direction by centrifugal force. Because the shroud band 224 extends only around the lower portion of the circumference of plates 204, 205, the oil thrown by the gears is discharged through the peripheral openings around the upper portion of the plates, and runs down the inner surface of casing 200 to collect in the reservoir formed in the bottom of the casing.

When a power plant embodying my invention is mounted on an aircraft after the manner shown in Fig. 2, and the aircraft is in flight, there is built up in the plenum chamber 7 an air pressure a certain amount higher than ambient pressure due to ram action, air being rammed into chamber 7, so to speak, due to the forward movement of the aircraft. The amount which the pressure in chamber 7 will exceed ambient pressure depends on the speed of the aircraft and the efficiency of the inlet in converting the relative velocity into pressure. From the plenum chamber 7 air flows radially inward to the compressor rotor inlets. Air is discharged from the compressor rotor to the spaces between the diffuser vanes 45 and in flowing through the diffuser passages, velocity of the air is converted into pressure; and such air of higher pressure is turned by vanes 54 and discharged to the air adapters 63. Air adapters 63 direct the air to the combustion chambers where the fuel supplied by fuel nozzles 76 is burned. The gases, the products of the combustions, are then discharged through the nozzles against the bucket ring to operate the turbine rotor. Only a portion of the energy is extracted from the gases by the turbine rotor. The remaining energy effects discharge of the gases through the nozzle 226 at high velocity to propel the aircraft by jet propulsion.

It is to be noted that the airflows from the adapters 63 to the combustion chambers and, having burned fuel in the combustion chambers, flows on in the same almost straight line to the turbine rotor and thence to the exhaust collector, the exhaust pipe 265 and the discharge nozzle 266. In no instance does the flow beyond the compressor discharge have to reverse itself. This arrangement serves to give a low pressure drop through the apparatus, resulting in improved performance. Also, it permits of the power plant being built with minimum size and with an optimum streamlined shape so that it fits well into a nacelle.

As indicated in dotted lines in Fig. 11, the free end of air baffle 69$^a$ telescopes within the free end of annular baffle 147 and serves to direct air from plenum chamber 7 to air chamber 157 from which air flows through openings 90 to the space between walls 87 and 146. From this space, air is pumped by vanes 117 on the turbine wheel out through space 145 to chamber 8 from which chamber it escapes rearwardly to atmosphere. This flow of air serves to cool the turbine wheel, the bearings and adjacent parts, and the combustion chamber walls 126 and 129.

Baffles 69$^a$ and 147 serve also to prevent hot air from chamber 8 being drawn into the rear impeller inlet, a thing which would cause lower power output.

The arrangement whereby the power plant is built from separate assemblies bolted together, the compressor rotor having its own two bearings and the turbine rotor likewise having its own two bearings, the two rotors being connected together by a gear coupling which permits of separate axial adjustment of the two rotors is of substantial advantage and is one important feature of my invention. Such arrangement permits adjustment of the clearances of the compressor rotor and the turbine rotor independently by adjusting axially the ball bearing 22 of the compressor rotor and the ball bearing 84 of the turbine rotor; and when adjusted the ball bearings act as thrust bearings to hold the respective rotors in the positions to which they have been adjusted. Since these bearings are located relatively close to the clearances they serve to hold, closer clearances can be held than would be the case otherwise because the differential expansion from the bearings to the clearances will be small. The arrangement eliminates the necessity for a heavy shaft such as would be required if the compressor impeller and turbine wheel were carried on the same shaft supported in two bearings. Again, the arrangement permits of the use throughout of solid casing walls and solid rings since the compressor structure and the combined combustion chamber and turbine structure can be assembled separately by bringing their several parts together axially and the two assemblies then connected together by bringing them also together axially. This avoids split casings and rings whereby there results a reduction in the weight required to provide a structure of the desired strength. The arrangement has the advantage also that when repairs are required any one of the assemblies can be removed and a new one substituted without having to match parts or balance parts together. Also, a power plant as a whole can be quickly removed from an aircraft and a new power plant substituted since the power plant is a complete unit and when being installed in an aircraft requires the making of no internal connections and but few external connections. Because of the few connections to be made during installation in an aircraft, there is little opportunity for errors in piping and connections to the unit. The most complicated piping is a part of the power plant and may be done at the factory when the power plant is assembled and tested when the power plant is tested.

The various parts of the power plant are readily accessible for inspection and repair. A power plant can be quickly separated into its separate unitary sections after which each unitary section may be inspected and any needed repairs made. And after inspection and repair, the sections may be again assembled.

By making the power plant as a complete unit with all accessories, it can be tested as a unit before installation in an aircraft. This insures satisfactory performance and mechanical operation on the first run-up of the power plant.

The outwardly sloping arrangement of the combustion chambers around the turbine bearing housing and the way in which the adapters 63 are connected thereto is of particular advantage in that it permits of ready replacement of the combustion chamber liners. When it is desired to renew a liner, the rings of bolts 62 and 66 for the corresponding adapter are removed, after which spacing ring 65 is taken out and the air adapter slid toward the left to separate cap 75 from liner wall 132. The air adapter then can be lifted away. With the air adapter out of the way, the liner 132 can be slid axially out of the combustion chamber casing and a new one substituted after which the air adapter can be replaced, it being first positioned in line with the casing, then slid axially to bring dome 75 into the end of the liner. And following this, spacing ring 65 is replaced and the air adapter again bolted into place.

Thus by my invention, I provide a power plant which is light in weight, simple and compact in structure, streamlined in shape, easy to assemble, disassemble, install and repair, and because of its comprising unitary sections, each complete in itself, well adapted for quantity production.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a power plant the combination of a combustion and turbine section including a housing, axially spaced bearings carried by the housing, a shaft supported in said bearings and carrying a turbine wheel at one end and a shaft coupling member at the other end, the bearing remote from the turbine rotor being axially adjustable relative to the housing and constructed and arranged to carry the thrust loads imposed on the turbine shaft, a plurality of elongated combustion chambers supported on the housing in radially spaced relation thereto and in circumferentially spaced relation to each other, said elongated chambers extending in a generally axial direction with their discharge ends located adjacent the turbine wheel and adapted to deliver hot gases thereto; a compressor section including a casing, axially spaced bearings carried by the casing, a compressor impeller arranged between said last-mentioned bearings and having a shaft supported therein, one of said last-mentioned bearings being axially adjustable relative to the casing and constructed and arranged to carry thrust loads imposed on the compressor shaft, said compressor shaft having a coupling member at one end thereof and the compressor casing having walls defining a vane type diffuser with a separate axially facing discharge opening for each diffusing passage; means connecting said housing and casing together with said coupling members in adjacent axially spaced relation, means connecting the coupling members constructed and arranged to allow independent axial adjustment of the turbine shaft and the compressor shaft relative to said casing and housing whereby the respective turbine and compressor clearances may be separately adjusted, and a separate air adapter member for conveying air from each diffuser discharge opening to the adjacent inlet end of a combustion chamber.

2. In a power plant, a combustion chamber and turbine section comprising a housing having a bolting flange at its front end and at its rear end, spaced bearings carried by the housing, a shaft journaled in said bearings, a turbine wheel overhung on an end of said shaft; a sub-assembly bolted to the rear end bolting flange comprising a ring structure, a nozzle ring carried by the ring structure for directing gases to the turbine wheel, and a plurality of combustion chambers carried by the ring structure in circumferentially spaced relation to each other for supplying gases to the nozzle ring; and straps connecting said ring structure to said front end flange.

3. In a power plant, a combustion chamber and turbine section comprising a housing having a rear bolting flange, bearings carried by the housing, a shaft in said bearings, a turbine wheel carried by the shaft, a pair of radially spaced apart concentric rings, a plurality of combustion chambers having their discharge ends fixed between said rings to provide an annular gas discharge opening, an annular nozzle ring structure fastened to said spaced apart rings for receiving gases from said combustion chambers and discharging it to the turbine wheel, and means fastening said spaced apart rings to said bolting flange.

4. In a power plant, a combustion chamber and turbine section comprising a housing having bolting flanges at its front and rear ends, bearing means carried by said housing, a shaft carried in said bearing means, a turbine wheel overhung on one end of said shaft, a coupling head on the other end of said shaft, a nozzle ring mounted on said rear bolting flange having guide vanes to direct gas to the turbine wheel, a ring surrounding the nozzle ring, combustion chambers having their rear ends connected to the nozzle ring and to said surrounding ring, straps connecting said surrounding ring to said front bolting flange, vanes carried by the turbine wheel for effecting flow of cooling air, and vanes carried by said housing which form a diffuser for the first-named vanes.

5. In a power plant, a combustion chamber and turbine section comprising a one piece tubular housing having a bell-shaped front end terminating in a front flange and a rear end having a rear flange, a shaft journaled in said housing, a turbine wheel overhung on one end of the shaft, a coupling member on the other end of the shaft, circumferentially spaced struts which connect the periphery of the bell-shaped front end to the rear end of the housing, a sub-assembly fastened to said rear flanges comprising radially spaced rings, combustion chambers having their discharge ends connected to said rings and a nozzle ring connected to said spaced rings; and straps connecting said front housing flange to the outer of said radially spaced rings.

6. In a power plant, a compressor section comprising a casing having bearings, a rotor comprising an impeller supported in said bearings, said casing having side walls and curved vanes therebetween which define curved diffuser passages, end walls which close the ends of said diffuser passages, a side wall of each diffuser passage at its outer end being provided with an axially facing discharge opening, a bolting flange surrounding each such opening, a combustion and turbine section comprising a turbine housing, a turbine rotor, and a plurality of combustion chambers having axially facing admission openings; and air adapters connected to said bolting flanges for connecting said diffuser openings to said combustion chamber admission openings.

7. A gas turbine power plant comprising a compressor section having a casing and a rotor; a combustion and turbine section having a turbine housing, a turbine rotor and a plurality of combustion chambers which receive air from the compressor section and deliver gases to the turbine section; means connecting the compressor section casing to the turbine housing and the compressor rotor to the turbine rotor, and air adapters connecting the compressor section discharge to the combustion chamber inlets, each air adapter having as a part thereof a fuel nozzle and a combustion chamber end cap.

8. A gas turbine power plant comprising a compressor section having a casing and a rotor; a combustion and turbine section having a turbine housing, a turbine rotor and a plurality of combustion chambers which receive air from the compressor section and deliver gases to the turbine section; means connecting the compressor section casing to the turbine housing and the compressor rotor to the turbine rotor, air adapters connecting the compressor section discharge to the combustion chamber inlets, each air adapter having as a part thereof a fuel nozzle and a combustion chamber end cap, and an ignition plug carried by at least one of said adapters and projecting into its end cap.

9. In a power plant, a compressor section comprising a casing having bearings, a rotor comprising an impeller supported in said bearings, said casing having side walls and curved vanes therebetween which define curved diffuser passages, end walls which close the ends of said diffuser passages, a side wall of each diffuser passage at its outer end being provided with an axially facing discharge opening, a bolting flange surrounding each such opening; a combustion and turbine section comprising a turbine housing, a turbine rotor, and a plurality of combustion chambers having axially facing admission openings; and air adapters connected to said bolting flanges for connecting said diffuser openings to said combustion chamber admission openings.

10. In a power plant, a compressor section comprising a casing having bearings, a rotor comprising an impeller supported in said bearings, said casing having walls which define a diffuser, and a plurality of circumferentially spaced axially facing openings for discharge of air from the diffusers; a combustion and turbine section comprising a turbine housing, a turbine rotor and a plurality of combustion chambers having axially facing admission openings; and air adapters connecting said diffuser openings to said combustion chamber admission openings, each adapter having as a part thereof a fuel nozzle and combustion chamber end cap.

11. In a power plant, a compressor section comprising a casing having bearings, a rotor comprising an impeller supported in said bearings, said casing having walls which define a diffuser, and a plurality of circumferentially spaced axially facing openings for discharge of air from the diffuser; a combustion and turbine section comprising a turbine housing, a turbine rotor and a plurality of combustion chambers having axially facing admission openings; and air adapters connecting said diffuser openings to said combustion chamber admission openings, each adapter having as a part thereof a fuel nozzle and combustion chamber end cap, and a spark plug carried by at least one of said adapters and projecting into the end cap in such adapter.

12. In a gas turbine power plant, a compressor section, a combustion chamber and turbine section and an auxiliaries section, each a complete unit, the casing of the combustion chamber and turbine section being bolted to the compressor casing on one side and the auxiliaries section being bolted to it on the other side, and couplings connecting the rotors of the respective sections, adjacent compressor casing and auxiliaries casing walls defining a lubricant reservoir, and adjacent compressor casing and combustion and turbine casing walls defining a lubricant sump, said auxiliaries section comprising a lubricant pump for pumping lubricant from the supply reservoir to power plant parts requiring lubrication and a scavenging pump for pumping lubricant from said sump back to said reservoir.

13. In a gas turbine power plant, axially aligned compressor and turbine sections, said compressor section having a diffuser comprising walls which define axially facing discharge openings, combustion chambers arranged in circumferentially spaced relation to each other, each combustion chamber having a removable liner and having its inlet end spaced axially from one of said axially facing discharge openings, and removable adapters for conveying air from said discharge openings to said combustion chambers whereby by removing an adapter, a combustion chamber liner may be removed.

14. In a gas turbine power plant, axially aligned compressor and turbine sections, said compressor section having a diffuser comprising walls which define axially facing discharge openings, combustion chambers arranged in circumferentially spaced relation to each other, each combustion chamber having a removable liner and having its inlet end spaced axially from one of said axially facing discharge openings, and removable adapters connected between said discharge openings and said combustion chambers, the connections with said openings including spacing rings which when removed permit of axial movement of the adapters to facilitate removal.

15. In a power plant, a compressor having a shaft with a toothed coupling head on one end, a turbine having a shaft axially aligned with the compressor shaft and having a toothed coupling head on its shaft axially spaced from the coupling head on the compressor shaft, a tubular sleeve having internally toothed ends engaging said coupling heads, and means for supplying lubricant to an outer side wall of one coupling head from whence it is pumped by rotation of the coupling through the tubular sleeve to the other coupling head.

16. In a power plant, a compressor having a shaft with a toothed coupling head on one end, a turbine having a shaft axially aligned with the compressor shaft and having a toothed coupling head on its shaft axially spaced from the coupling head on the compressor shaft, a tubular sleeve having toothed ends engaging said coupling heads, a radially inwardly projecting shield carried by said tubular sleeve at one end in spaced relation to the outer side wall of one of said heads, and means for supplying lubricant to the space between said head and shield from whence it is pumped by centrifugal force due to rotation through the adjacent coupling and then through the other coupling.

17. In a gas turbine power plant, an auxiliaries section comprising walls which define a lubricant reservoir, starting gearing carried by said walls and located in said lubricant reservoir, auxiliaries driving gears carried by said walls and located in said lubricant reservoir, a casing which encloses at least in part said auxiliaries driving gears, and a passage of predetermined area connecting the lubricant reservoir with said casing through which lubricant flows from the reservoir to the casing.

18. In a gas turbine power plant, a compressor section having an air inlet, an auxiliaries section connected to the compressor section and defining with walls thereof a lubricant reservoir, an air baffle surrounding the compressor beyond said air inlet and forming a wall for directing air to the inlet, and a breather pipe connecting said lubricant reservoir to the region beyond said baffle.

19. In a gas turbine power plant, a compressor section having an air inlet, an auxiliaries section connected to the compressor section and defining with walls thereof a lubricant reservoir, an air baffle surrounding the compressor beyond said air inlet and forming a wall for directing air to the inlet, and a breather pipe which connects with the lubricant reservoir above the normal lubricant level therein and extends across the top of the compressor section to a point beyond said baffle.

20. A gas turbine power plant having a combustion section comprising a group of circumferentially spaced outer tubes the axes of which are along the elements of a cone and the ends of which are flattened and connected together forming an annular discharge, liners within said outer tubes having holes for flow of air into the combustion zone, cross ignition tubes connecting said outer tubes and connecting said liners, and an end cap in which is located a fuel nozzle and an ignition plug.

21. In a gas turbine power plant, a compressor section comprising an impeller having a shaft on each side, bearings for the shafts, outwardly flaring bearing supporting walls having flanges at their outer peripheries, front and rear compressor casing walls on opposite sides of the impeller having flanges at their outer peripheries, truss rings connecting together said flanges, the spaces between said walls defining passages for flow of air to the inlet of the impeller, and a diffuser for the impeller which surrounds the impeller and is fastened between said compressor casing flanges.

22. In a gas turbine power plant, a compressor section comprising an impeller having a shaft on each side, bearings for the shafts, outwardly flaring bearing supporting walls having flanges at their outer peripheries, front and rear compressor casing walls on opposite sides of the impeller having flanges at their outer peripheries, truss rings connecting together said flanges, the spaces between said walls defining passages for flow of air to the inlet of the impeller, a diffuser for the impeller which surrounds the impeller and is fastened between said compressor casing flanges, said diffuser having walls which define axially facing discharge openings, and turning vanes for directing air from its approximately tangential direction of flow in the diffuser to said axially facing discharge openings.

23. In a gas turbine power plant, a compressor section comprising an impeller having a shaft on each side, bearings for the shafts, outwardly flaring bearing supporting walls having flanges at their outer peripheries, front and rear compressor casing walls on opposite sides of the impeller having flanges at their outer peripheries, truss rings connecting together said flanges, curved walls in the spaces between bearing supporting walls and said compressor casing walls which define passages for directing flow of air to the inlet of the impeller, and a diffuser for the impeller which surrounds the impeller and is fastened between said compressor casing flanges.

DALE D. STREID.

REFERENCES CITED

The following references are of record in the file of this patent:

UNITED STATES PATENTS

| Number | Name | Date |
|---|---|---|
| 1,366,149 | Applin | Jan. 18, 1921 |
| 1,838,477 | Elsea | Dec. 29, 1931 |
| 1,857,486 | Trumpler | May 10, 1932 |
| 1,998,778 | Gregg | Apr. 23, 1935 |
| 2,256,345 | Mart | Sept. 16, 1941 |
| 2,274,743 | Rosskopf | Mar. 3, 1942 |
| 2,289,231 | Auger et al. | July 7, 1942 |

FOREIGN PATENTS

| Number | Country | Date |
|---|---|---|
| 347,206 | Great Britain | Apr. 16, 1931 |
| 456,976 | Great Britain | Nov. 16, 1936 |
| 469,180 | Great Britain | July 20, 1937 |
| 514,634 | Great Britain | Nov. 14, 1939 |
| 807,926 | France | Oct. 26, 1936 |